United States Patent [19]

Ogiwara et al.

[11] Patent Number: 5,656,896
[45] Date of Patent: Aug. 12, 1997

[54] POWER SUPPLY FOR VIBRATING COMPRESSORS

[75] Inventors: Kazuyuki Ogiwara; Naoki Akazawa, both of Nitta-machi, Japan

[73] Assignee: Sawafuji Electric Co., Ltd., Tokyo, Japan

[21] Appl. No.: 595,258

[22] Filed: Feb. 1, 1996

[30] Foreign Application Priority Data

Feb. 7, 1995 [JP] Japan .................................. 7-018898

[51] Int. Cl.⁶ .............................. H02M 7/53; H02K 33/00
[52] U.S. Cl. ........................ 318/114; 318/129; 318/134
[58] Field of Search ........................... 318/114, 115, 318/119, 123, 125, 127, 128, 129, 132, 134; 388/928.1; 417/410.1, 416, 417

[56] References Cited

U.S. PATENT DOCUMENTS 4,027,211   5/1977   Omura et al. ............................ 318/127
4,320,448   3/1982   Okuda et al. ........................ 318/132 X

FOREIGN PATENT DOCUMENTS 54-74184   2/1991   Japan .

*Primary Examiner*—Bentsu Ro
*Attorney, Agent, or Firm*—McGlew and Tuttle

[57] ABSTRACT

A power supply for vibrating compressors comprises a voltage booster circuit portion having voltage changing means for boosting the DC voltage of a commercially available battery and changing the boosted voltage, and an AC voltage generating circuit portion for supplying the boosted DC voltage to the vibrating compressor. The AC voltage generating circuit portion comprises a MOSFET or bipolar transistor for driving a vibrating compressor, a timer IC for generating pulses to cause the MOSFET or bipolar transistor to switch, a forced operation circuit for detecting a timing at which a counter electromotive force generated by the vibrating compressor during the OFF period of the MOSFET or bipolar transistor is recovered to the neighborhood of 0 volts and forcibly reversing the output of the timer IC, and a driver for driving the MOSFET based on the output of the timer IC or a base-current supply circuit for controlling the bipolar transistor.

9 Claims, 7 Drawing Sheets

POWER SUPPLY FOR VIBRATING COMPRESSORS

BACKGROUND OF THE INVENTION AND RELATED ART STATEMENT

This invention relates generally to a power supply for vibrating compressors, and more particularly to a power supply for vibrating compressors of a type having a vibrating drive coil in a magnetic field, in which a timing at which a counter electromotive force generated in the drive coil is recovered to the neighborhood of 0 volts is detected, and an AC voltage is generated in synchronism with that timing to feed a drive current to the drive coil from the outside to ensure efficient operation of the vibrating compressor.

Conventional power supplies for vibrating compressors have heretofore been of such a type that an AC voltage of a frequency agreeing with the mechanical frequency of a vibrating compressor is caused to generate in a complex circuit configuration (Japanese Patent Application Ser. No. Sho-54(1979)-74184) to feed to the vibrating compressor.

Another type of power supply is also known, in which a battery voltage is boosted by a DC—DC converter using a transformer, and the boosted voltage is fed to the vibrating compressor.

In the prior-art vibrating compressors, however, the circuit for causing the electrical system and the mechanical system to resonate with each other has been constructed by discrete devices due to the complexity of its circuit configuration. This has led to increased cost and troublesome maintenance. Furthermore, the use of a transformer has resulted in increased weight and cost.

SUMMARY OF THE INVENTION

This invention is intended to overcome the aforementioned shortcomings.

It is an object of this invention to provide a power supply for vibrating compressors in which circuit configuration is simplified to reduce cost.

It is another object of this invention to provide a power supply for vibrating compressors in which a transformer is omitted to reduce weight and cost.

It is still another object of this invention to provide a power supply for vibrating compressors in which a MOSFET or bipolar transistor is used as a switching element for converting direct current into alternating current, and a timer IC is used to generate pulses for switching the MOSFET or bipolar transistor so as to simplify circuit configuration, obtain optimal DC voltage using a transformerless DC voltage booster circuit, and reduce weight and overall cost.

To achieve these objectives, the power supply for vibrating compressors of this invention has an AC voltage generating circuit portion for generating an AC voltage fed to the vibrating compressor; the AC voltage generating circuit portion comprising a MOSFET for driving the vibrating compressor, a timer IC for generating pulses to switch the MOSFET, a timer forced operation circuit for detecting a timing at which the counter electromotive force generated by the vibrating compressor during the OFF period of the MOSFET is recovered to the neighborhood of 0 volts, and forcibly reversing the output of the timer IC in synchronism with the detected timing, and a driver for driving the MOSFET based on the output of the timer IC, whereby the optimum voltage is fed to the vibrating compressor so as to supply an AC voltage of the most efficient frequency to the vibrating compressor.

In a circuit configuration using a bipolar transistor in place of the MOSFET, a base-current supply circuit for controlling the bipolar transistor based on the output of the timer IC is used. That is, the power supply for vibrating compressors of this invention has an AC voltage generating circuit portion for generating an AC voltage fed to the vibrating compressor; the AC voltage generating circuit portion comprising a bipolar transistor for driving the vibrating compressor, a timer IC for generating pulses for switching the bipolar transistor, a timer forced operation circuit for detecting a timing at which the counter electromotive force generated by the vibrating compressor during the OFF period of the bipolar transistor is recovered to the neighborhood of 0 volts, and forcibly reversing the output of the timer IC in synchronism with the detected timing, and a base-current supply circuit for controlling the bipolar transistor based on the output of the timer IC.

The power supply for vibrating compressors of this invention supplies optimal voltage to the vibrating compressor by providing a DC voltage booster circuit portion in the preceding stage of the AC voltage generating circuit portion.

As described above, this invention has such a construction that the DC voltage of a power source is converted into optimal DC voltage for the vibrating compressor, and the supply of power to the vibrating compressor is controlled by a switching element, that is, a MOSFET or bipolar transistor; the pulses for switching the switching element, that is, the MOSFET or bipolar transistor, are generated by the timer IC, and the output of the timer IC is forcibly reversed by the timer forced operation circuit so that an AC voltage is applied to the vibrating compressor at a predetermined timing. With this arrangement, the DC voltage of a commercially available battery can be boosted to a desired voltage, so that power of optimal voltage can be supplied to match different drive voltages required for specific vibrating compressors of different specifications, and the vibrating compressor can be operated efficiently with a fewer number of parts and a simplified circuit configuration.

DETAILED DESCRIPTION OF THE EMBODIMENTS

Figure 1:
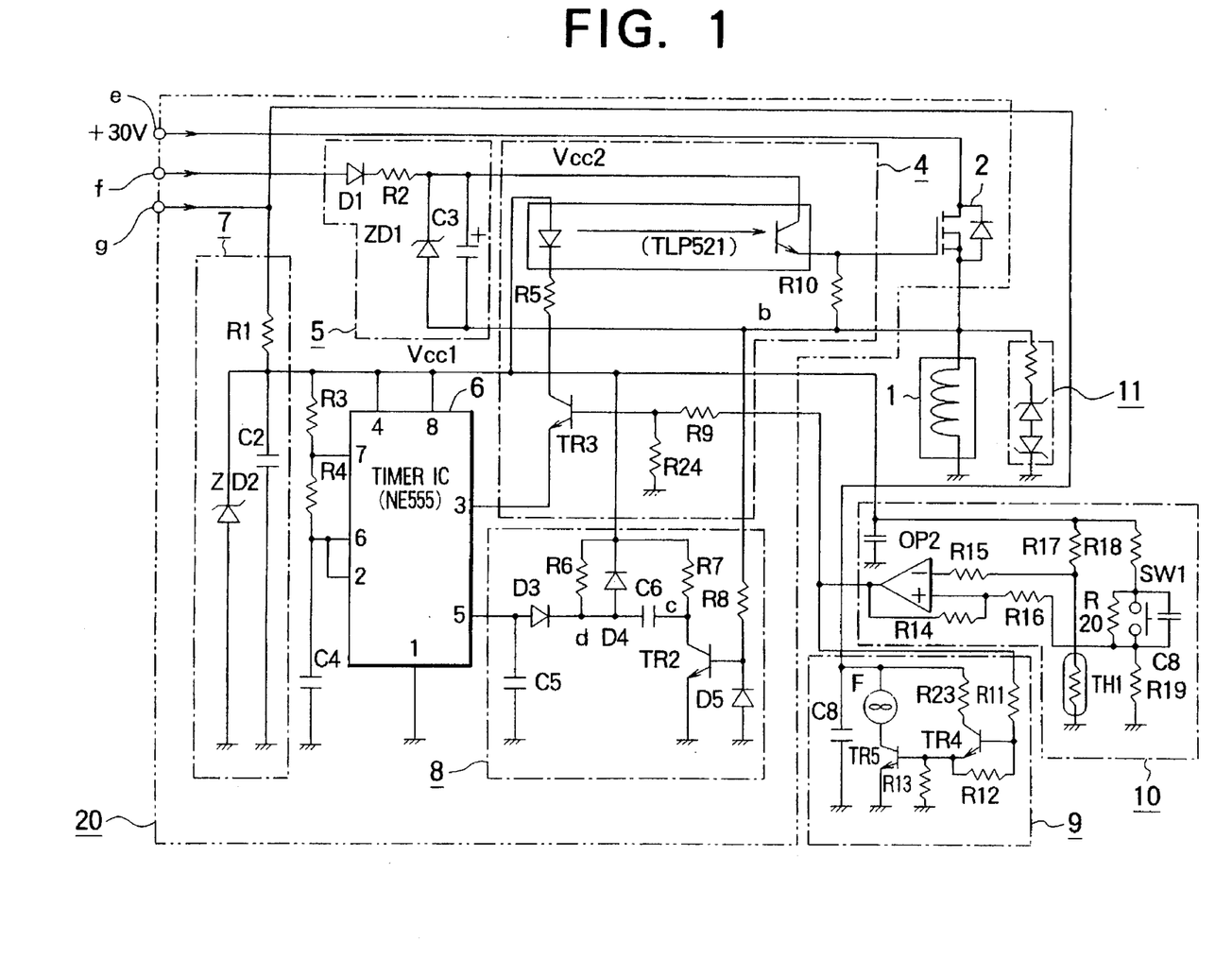
FIG. 1 shows a construction of a power supply for vibrating compressors according to this invention.

FIG. 1 shows a construction of a power supply for vibrating compressor according to this invention.

In FIG. 1, reference numeral 20 refers to an AC voltage generating circuit portion in which a vibrating compressor 1 is connected between the source of a MOSFET 2, which is a switching element, and the ground. The drain of an n-channel MOSFET 2 is connected to the positive +30-V side (Terminal e), for example, of the output that will be described with reference to FIG. 6. The +30-V voltage can be obtained by boosting the +12-V output of a battery 3 in a voltage booster circuit portion 30. The vibrating compressor 1 is used for an automobile refrigerator, for example, and the battery 3 is of a commercially available automobile-mounted type.

A driver 4 and a gate voltage circuit 5 are connected to the gate of the MOSFET 2, to which a gate voltage Vcc2 of approximately 12 V is fed from the gate-voltage circuit 5. The driver 4 and the gate-voltage circuit 5 are drive means for the switching element. The input of the gate-voltage circuit 5 is connected to the output (Terminal f) of the voltage booster circuit portion 30 shown in FIG. 6.

The driver 4 receives a pulse signal (oscillation output) output by a timer IC 6 (NE555, for example), and generates a gate signal of the MOSFET 2 based on the received pulse signal. A source voltage Vcc1 is fed from a stabilization circuit 7 to the timer IC 6. The timer IC 6 as pulse generating means for switching the switching element operates as an astable multi-vibrator. The HIGH/LOW time of the output T Pin (or Terminal) No. 3 of the timer IC 6 is determined by resistors R3 and R4, and a capacitor C4 connected to Pin (or Terminal) Nos. 6 and 7 of the timer IC 6, as shown in the figure. The HIGH-level time T1 is normally expressed by T1=0.693 (R3+R4)·C4, while the LOW-level time T2 by T2=0.693·R4·C4. The input of the stabilization circuit 7 is connected to the output (Terminal g) of the voltage booster circuit portion 30 shown in FIG. 6. Terminal g is also connected to a fan drive circuit 9 for driving a fan F, and used as the power supply thereof.

Figure 6:
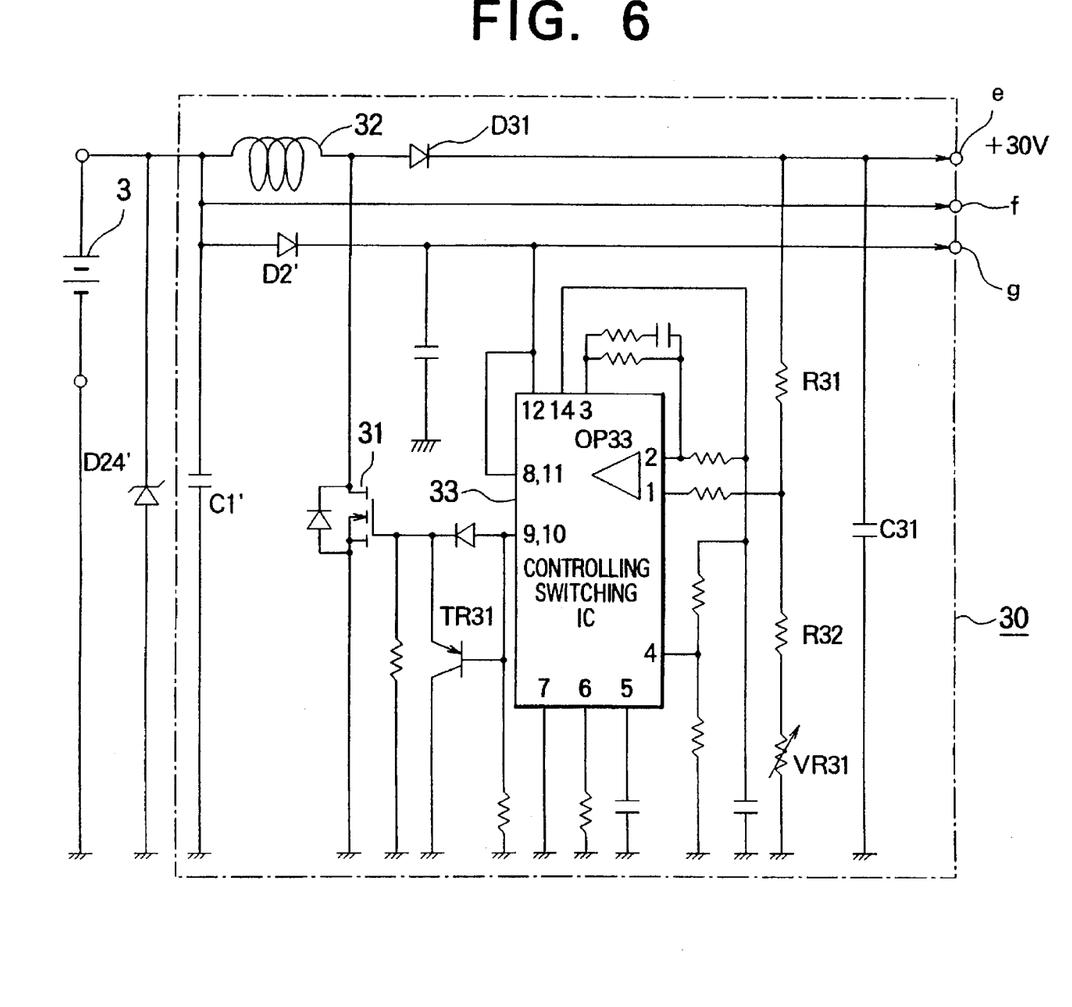
FIG. 6 shows a construction of the voltage booster circuit portion of a power supply for vibrating compressor according to this invention.

The power supply shown in FIG. 1 (and FIG. 4, which will be described later) supplies to the vibrating compressor 1 the voltage obtained by boosting the voltage of the battery 3 in FIG. 6. Consequently, the power supply shown in FIG. 1 (and FIG. 4) constitutes a single power supply, together with the voltage booster circuit portion 30 shown in FIG. 6.

To Pin No. 5 of the timer IC 6 connected is a timer forced operation circuit 8, which forcibly turns the HIGH-level output at Pin No. 3 to a LOW level at a predetermined timing. The signal output to Pin No. 3 is an output of the timer IC 6 and at the same time the output of the astable multivibrator that is the timer IC 6. Consequently, the timer IC 6 is an oscillation circuit, whose oscillation frequency is determined by external resistors R3 and R4 and an external capacitor C4, having a function to forcibly turn the HIGH level of the oscillation output thereof to a LOW level.

The MOSFET 2 as a switching element provided according to this invention is driven by the driver 4. The driver 4 operates based on the oscillation output at Pin No. 3 of the timer IC 6. The drive output of the driver 4 is supplied by the gate-voltage circuit 5. The oscillation output of the timer IC 6 is forcibly changed by the timer forced operation circuit 8. The timer forced operation circuit 8 uses as an input the potential at a connecting point between the source of the MOSFET 2 and the vibrating compressor 1, and detects changes in the input. That is, the operation of the timer forced operation circuit 8 is dependent on (in synchronism with) the vibrating compressor 1.

Consequently, the switching of the MOSFET 2 is basically determined by the oscillation output of the timer IC 6, and can also be forcibly changed at a predetermined timing in synchronism with the operation of the vibrating compressor 1. The timing at which the switching operation is changed is a timing at which the counter electromotive force generated by the vibrating compressor 1 is recovered to the neighborhood of 0 volts, as will be described later.

To the driver 4 connected is a thermo-control circuit 10 for keeping temperature in a refrigerator incorporating the vibrating compressor 1 constant. Numeral 11 refers to a counter electromotive force clamping circuit for clamping the counter electromotive force generated in the vibrating compressor 1.

The operation of the AC voltage generating circuit portion of the vibrating compressor embodying this invention having the aforementioned construction will be described in the following.

Figure 3:
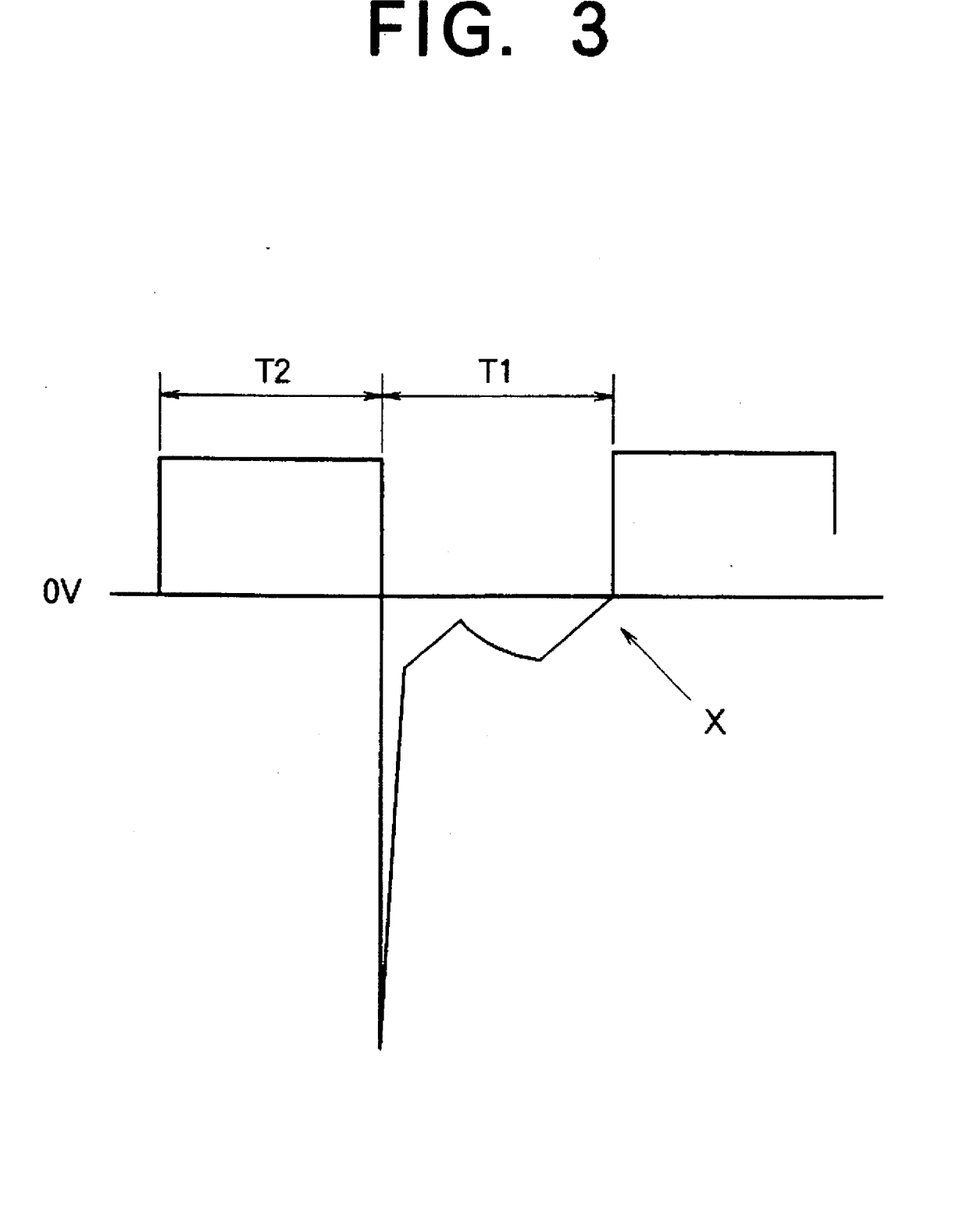
FIG. 3 is a diagram of assistance in explaining the counter electromotive force generated in the vibrating compressor.

Since the MOSFET 2 is connected in a source-follower fashion, a source voltage Vcc2, which is approximately 12 V, for example, with respect to the source of the MOSFET, and stabilized by the gate-voltage circuit 5, is provided as a signal to be applied between the gate and source of the MOSFET 2. That is, when the MOSFET 2 is turned off, a counter electromotive force as shown in FIG. 3 is generated on the source side of the MOSFET 2 by the inductance of the vibrating compressor 1. This causes a diode D1 to conduct, charging a capacitor C3 to maintain the source voltage Vcc2. At this time, the source voltage Vcc2 and the source-drain voltage of the MOSFET 2 are kept at approximately 12 V by a constant-voltage diode ZD1.

In the following, the operation will be described, referring to the time chart of FIG. 2.

Figure 2:
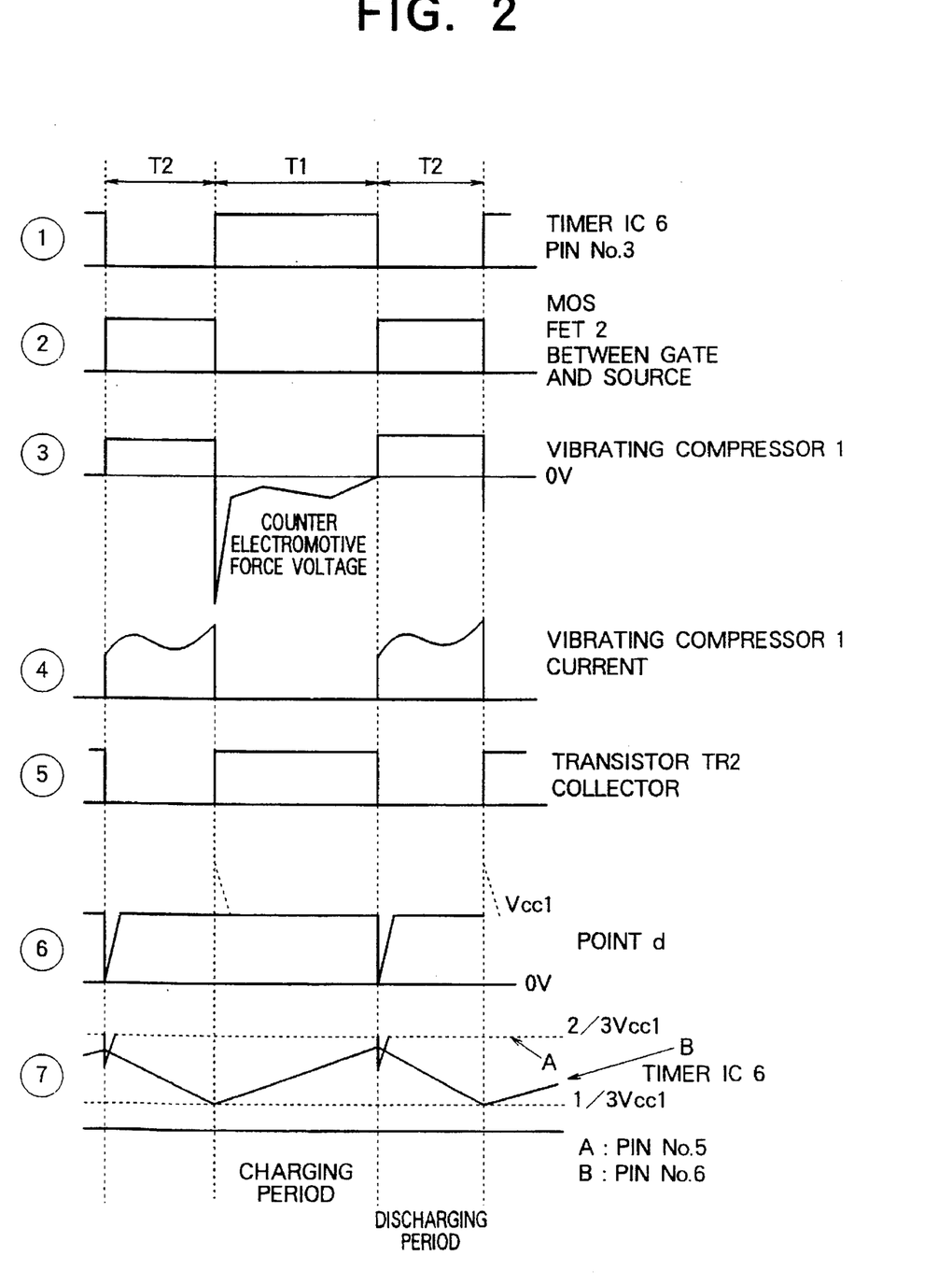
FIG. 2 is a time chart of assistance in explaining the operation.

When the output at Pin No. 3 of the timer IC 6 becomes L (LOW level, 0 V, for example) (FIG. 2 (1)), a phototransistor in a photocoupler IC (TLP521, for example) is turned on via a transistor TR3, which is usually turned on, and the source voltage Vcc2 of approximately 12 V is applied to the gate of the MOSFET 2 (FIG. 2 (2)), turning on the MOSFET 2. Thus, the boosted voltage of the battery 3 of FIG. 6, which will be described later, is applied to the vibrating compressor 1 (FIG. 2 (3)). The optimum time required for applying voltage to the vibrating compressor 1 is empirically determined in terms of the construction of the vibrating compressor 1, and set to the ON time T2. Note that the time T2 is a duration in which the MOSFET 2 is kept ON, while the time T1 is a duration in which the MOSFET 2 is kept OFF.

After the lapse of the ON time T2, the output at Pin No. 3 of the timer IC 6 becomes H (HIGH level, a voltage Vcc1, for example) (FIG. 2 (1)), turning off the MOSFET 2. At that time, a counter electromotive force having a deep negative voltage is generated, as shown in FIG. 3, by the inductance of the vibrating compressor 1 (FIG. 2 (3)). This counter electromotive force is gradually recovered, exceeding 0 volts. The elapsed time until the counter electromotive force reaches a zero-crossing point (Point X in FIG. 3) varies with the pressure and temperature conditions of the vibrating compressor 1. It is empirically known that the highest efficiency can be achieved by applying the next pulse at Point X in FIG. 3. The timer forced operation circuit 8 is therefore actuated at this timing, that is, the timing at which the counter electromotive force is about to exceed 0 volts, or recovered to the neighborhood of 0 volts (to substantially 0 volts). That is, the output (at Pin No. 3) of the timer IC 6 is forcibly reversed from H to L, that is, from OFF time T1 to ON time T2 at this timing. Consequently, the timer forced operation circuit 8 forcibly reverses the output of the pulse Generating means (6) at the timing at which the counter electromotive force Generated by the vibrating compressor 1 during the OFF period of the switching element (2) is recovered to the neighborhood of 0 volts. This allows voltage to be applied to the vibrating compressor 1 at the optimum timing, as will be described in the following.

Since the source of the MOSFET 2 is kept at a negative potential by the counter electromotive force during OFF period of the MOSFET 2 (FIG. 2 (3)), the base of the transistor TR2 in the timer forced operation circuit 8 is reverse-biased, turning off the transistor TR2. As the counter electromotive force is recovered and the source-side voltage of the MOSFET 2 is about to exceed 0 volts, the transistor TR2 is turned on at that timing, causing potential of Point c on the collector side to reverse from H to L (FIG. 2 (5)).

The potential shift of Point c on the collector side from H to L is differentiated by a differentiation circuit consisting of a resistor R6 and a capacitor C6, and a sufficiently large trigger waveform as shown in FIG. 2 (6) appears at Point d on the cathode side of the diode D3. The trigger waveform (FIG. 2 (6)) shown by the upper dotted line that appears when the transistor TR2 is turned off, causing Point c on the collector side to shift from L to H, disappears as it is clamped to the voltage Vcc1 by She diode D4.

The aforementioned trigger waveform differentiated by the differentiation circuit consisting of the resistor R6 and the capacitor C6 is input to Pin No. 5 of the timer IC 6 via the diode D3. Pin No. 5 of the timer IC 6 serves as an input for controlling the ON time T1 output from Pin No. 3. The voltage at Pin No. 5 is therefore compared with the charging voltage of the capacitor C4 on Pin No. 6. If the voltage at Pin No. 5 is lower than that at Pin No. 6, control is effected so as to reverse the output at Pin No. 3.

Pin No. 5 is usually set to the ⅔ of the source voltage Vcc1, and higher than the charging voltage of the capacitor C4 input to Pin No. 6 (FIG. 2 (7)). As shown in FIG. 2 (7), however, when a sufficiently large trigger waveform is input, the voltage at Pin No. 5 becomes lower than the charging voltage of the capacitor C4 at Pin No. 6 before the voltage at Pin No. 6 reaches the ⅔ of the source voltage Vcc1. That is, the timer IC 6, which is an astable multivibrator, is triggered, and the output at Pin No. 3 is caused to be forcibly reversed from H to L at that timing. That is, the HIGH-level time T1 at Pin No. 3 is forcibly terminated, shifting to the aforementioned ON time T2 (FIG. 2 (1)).

This causes a phototransistor in the photocoupler IC to turn on, and Vcc2 is applied between the gate and source of the MOSFET 2 to turn on the MOSFET (FIG. 2 (2)). As a result, the boosted +30-V voltage is applied to the vibrating compressor 1 at the optimum timing.

At this time, an almost constant ON time T2 that is shorter than T2=0.693·R4·C4, as described above, can be obtained because the ON time T2 begins at a voltage lower than the ⅔ of Vcc1. The value of the ON time T2 in this invention is determined, taking into consideration the fact that the ON time T2 become shorter.

The ⅓ of Vcc1 in FIG. 2 (7) represents the level at which the HIGH-level time is started on Pin No. 3 when the charging voltage of the capacitor C4 reaches this level in case that Pin No. 5 of the timer IC 6 is not used or not connected with the timer forced operation circuit 8. The ⅔ of Vcc1, on the other hand, represents the level at which the LOW-level time is started on Pin No. 3 when the charging voltage of the capacitor C4 reaches this level.

The OP (operational) amplifier OP2 of the thermo-control circuit 10 compares at all times the voltage divided by a resistor R17 and a thermistor TH1 with the reference voltage obtained by dividing the stabilized Vcc1 voltage by resistors R18 and R20, and R19. The resistance value of the thermistor TH1 rises as temperature falls. Consequently, as the temperature in the refrigerator falls below a preset temperature, the output of the OP amplifier OP2 becomes L, cutting off the base current of the transistor TR3, turning off the transistor TR3. This causes the photodiode in the photocoupler IC to stop emitting light, continuously turning off the MOSFET 2. Consequently, voltage supply to the vibrating compressor 1 is stopped. As the temperature in the refrigerator rises, the output of the OP amplifier OP2 is reversed to H. With the output of the OP amplifier OP2 being H, the base current of the transistor TR3 is kept supplied, holding the transistor TR3 to the ON state, whereby the MOSFET 2 is caused to perform ON/OFF operation by a pulse signal output by the timer IC 6, causing the vibrating compressor 1 to resume operation.

Furthermore, as the temperature in the refrigerator falls below a preset temperature, the output of the OP amplifier OP2 becomes L, as described above. With the output of the OP amplifier OP2 becoming L, however, both the transistors TR4 and TR5 of the fan drive circuit 9 are turned off, causing the fan F to stop. As the temperature in the refrigerator rises above the preset temperature, both the transistors TR4 and TR5 are turned ON, causing the fan F to operate. This leads to a power saving for the battery 3.

Figure 4:
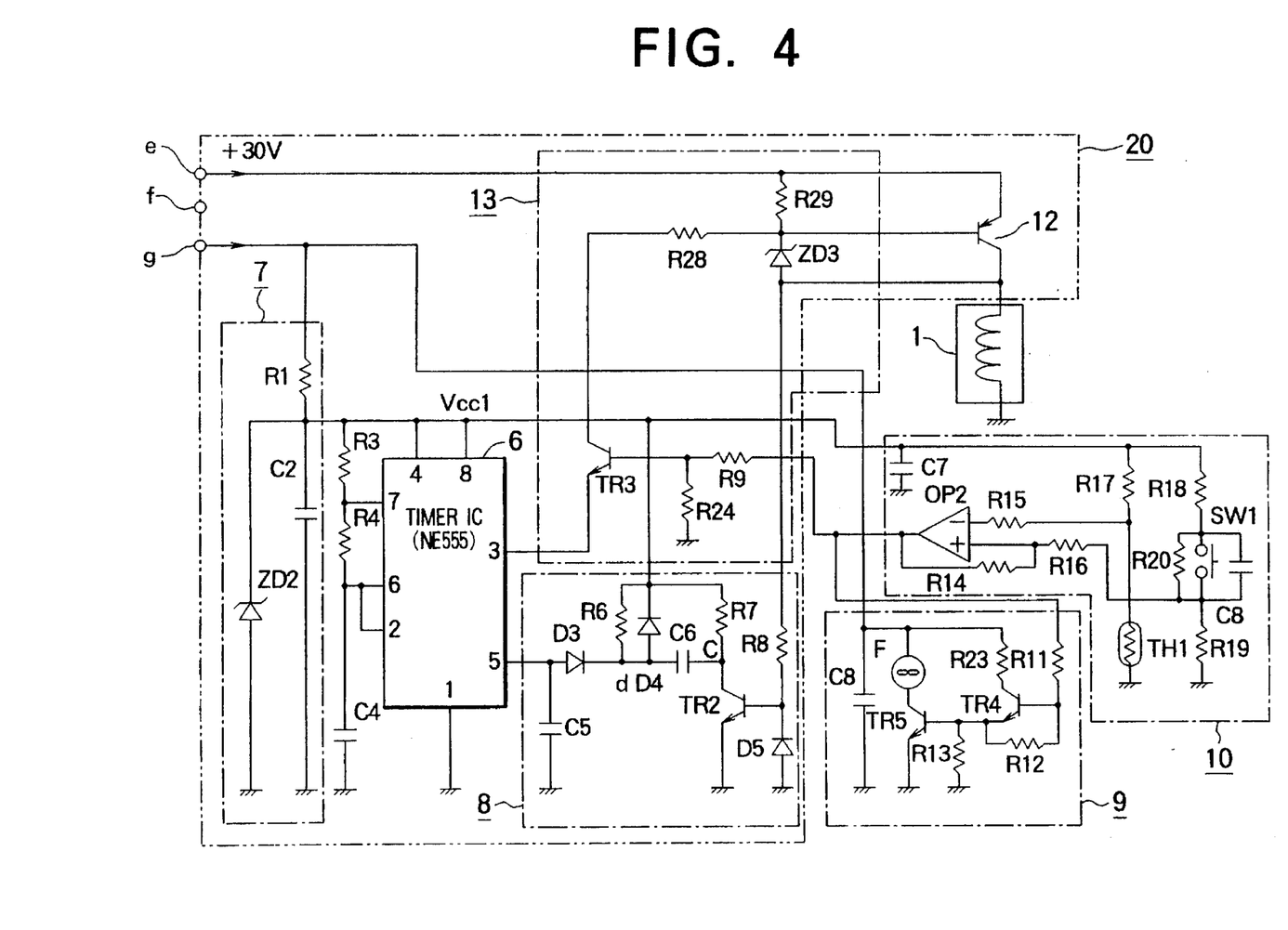
FIG. 4 shows another construction of a power supply for vibrating compressors according to this invention.

FIG. 4 shows another construction of a power supply for vibrating compressors according to this invention.

In FIG. 4, like parts are indicated by like numerals shown in FIG. 1. Numeral 12 refers to a bipolar transistor, which is a switching element, 13 to a base-current supply circuit. The bipolar transistor 12 corresponds to the MOSFET 2 in FIG. 1, and the base-current supply circuit 13 serves as switching-element drive means, corresponding to the gate-voltage circuit 5 and the driver 4 for driving the MOSFET 2 in FIG. 1. Terminal if is not used because the gate-voltage circuit 5 is not necessary.

In FIG. 4, the vibrating compressor 1 is connected between the collector of the PNP-type bipolar transistor 12 and the ground, and the emitter of the bipolar transistor 12 is connected to the positive +30-V (Terminal e) side, for example, of the output, which will be described later in reference to FIG. 6. The base of the bipolar transistor 12 is connected to the base-current supply circuit 13.

The base-current supply circuit 13 receives a pulse signal output by the timer IC 5 (NE555, for example), and causes a base current to flow in the bipolar transistor 12 based on the received pulse signal.

To the base-current supply circuit 13 connected are the timer forced operation circuit 8 and the thermo-control circuit 10 for keeping the temperature in the refrigerator constant. The clamping circuit 11 has been omitted in the figure, The operation of the power supply for vibrating compressor according to this invention having the aforementioned construction will be described in the following.

When the bipolar transistor 12 is in the OFF state, a counter electromotive force as shown in FIG. 3 is generated on the collector side of the bipolar transistor 12 by the inductance of the vibrating compressor 1. A timing at which the counter electromotive force generated by the vibrating compressor 1 during the OFF period of the bipolar transistor 12 is recovered to the neighborhood of 0 volts is detected, and the output of the timer IC 6 is forcibly reversed at that timing.

In the following, operation will be described, referring to the time chart of FIG. 5. The time chart shown in FIG. 5 is essentially the same as the time chart of FIG. 2.

Figure 5:
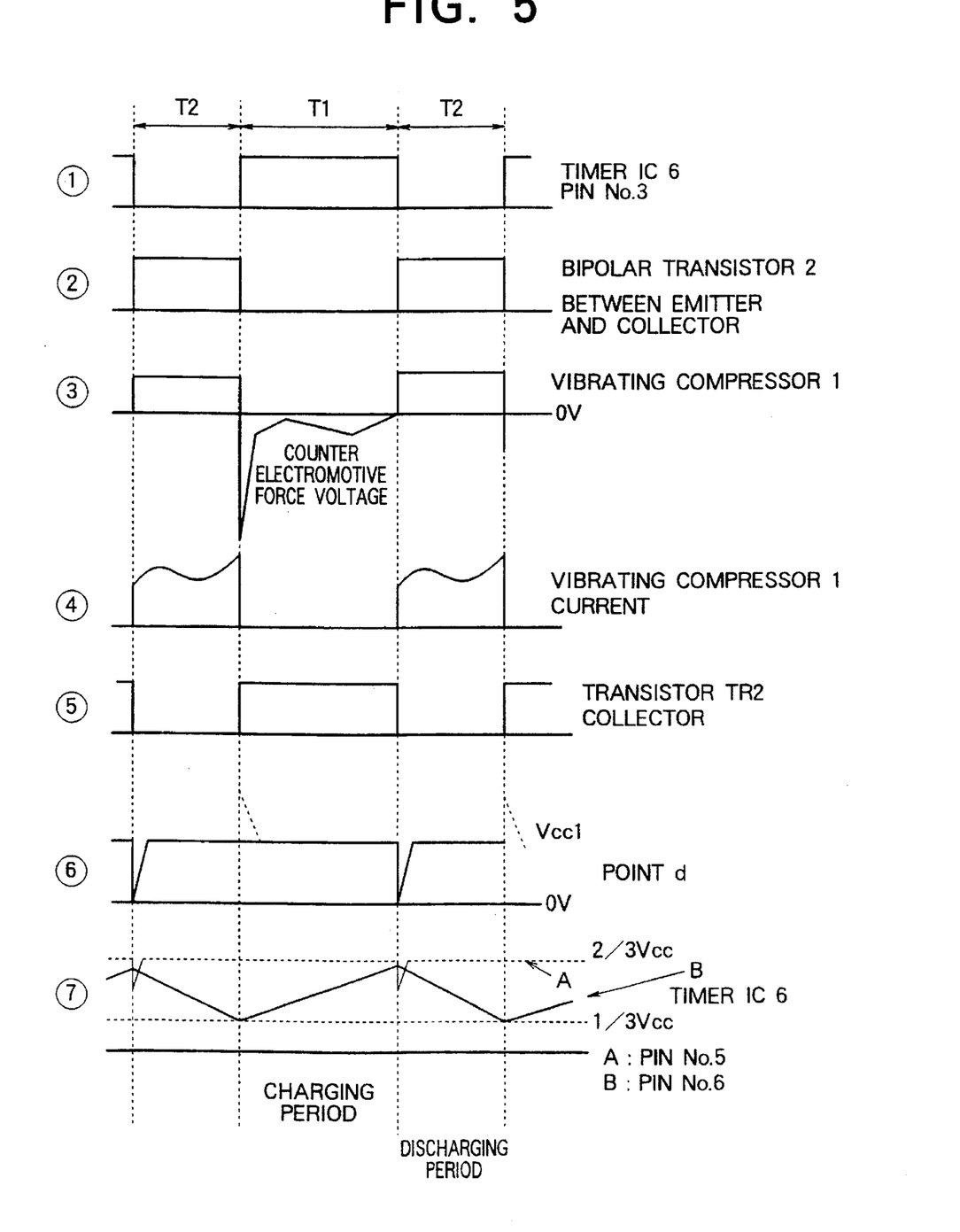
FIG. 5 is a time chart of assistance in explaining the operation.

As the output at Pin No. 3 of the timer IC 6 becomes L (FIG. 5 (1)), a base current flows in the bipolar transistor 12 via the transistor TR3 (FIG. 5 (2)), which is usually turned on, turning on the bipolar transistor 12. As a result, the boosted voltage of the battery 3 in FIG. 6 is applied to the vibrating compressor 1 (FIG. (3)).

After the lapse of the ON time T2, the output at Pin No. 3 of the timer IC 6 becomes H (FIG. 5 (1)), turning off the bipolar transistor 12. At that time, a counter electromotive force is generated, as described earlier (FIG. 5 (3)). The timer forced operation circuit 8 is actuated at a timing at which the counter electromotive force is recovered, exceeding 0 volts so that the output of the timer IC 6 is forcibly reversed from H to L, that is, from the OFF time T1 to the ON time T2 at that timing.

Since the collector of the bipolar transistor 12 is kept at negative potential (FIG. 5 (3)) by the counter electromotive force during the period when the bipolar transistor 12 remains in OFF state, the transistor TR2 is turned off. As the counter electromotive force is recovered, and the collector side of the bipolar transistor 12 is about to exceed 0 volts, the transistor TR2 is turned on at that timing, reversing potential of Point c on the collector side from H to L (FIG. 5 (5)). The trigger waveform shown in FIG. 5 (6) appears on Point d on the cathode side of the diode D3 in accordance with the potential shift of Point c on the collector side from H to L.

The aforementioned trigger waveform is input to Pin No. 5 of the timer IC 6 via the diode D3. As shown in FIG. 5 (7), the output at Pin No. 3 is forcibly reversed from H to L at the timing at which the trigger waveform is input. That is, the HIGH-level time T1 of Pin No. 3 is forcibly terminated, shifting to the aforementioned ON time T2 (FIG. 5 (1)).

The OP amplifier OP2 of the thermo-control circuit 10 compares at all times the voltage divided by the resistor 17 and the thermistor TH1 with the reference voltage obtained by dividing the stabilized Vcc1 voltage by the resistors R18 and R20, and R19.

As the temperature in the refrigerator falls below a preset level, the output of the OP amplifier OP2 becomes L, cutting off the base current of the transistor TR3, turning off the transistor TR3. This causes the bipolar transistor 12 to continuously turn off, stopping the operation of the vibrating compressor 1. As the temperature in the refrigerator rises, the output of the OP amplifier OP2 is reversed to H, and the bipolar transistor 12 is caused to resume ON/OFF operation by the pulse signal output by the timer IC 6, causing the vibrating compressor 1 to resume operation.

FIG. 6 shows a construction of the voltage booster circuit portion of the power supply for vibrating compressor according to this invention. A voltage booster circuit portion 30 is a transformerless circuit having voltage changing means for boosting the DC current of the battery 3 and changing the boosted voltage.

In FIG. 6, the basic part of the voltage booster circuit portion 30 comprises a MOSFET 31, choke coil 32, diode D31, controlling switching IC (TL494, for example) 33, and capacitor C31. A PWM controlling signal having such a pulse width that the voltage (to be input to Pin No. 1) obtained by dividing the output voltage at Terminal e by a resistor R31, and a resistor R32 and a variable resistor VR31 becomes equal to the reference voltage at Pin No. 14 of the controlling switching IC 33 is output to Pin Nos. 9 and 10 of the controlling switching IC 33. This PWM controlling signal is impressed to the gate of the MOSFET 31 by the switching operation of the transistor TR31. With this, the MOSFET 31 is PWM-controlled.

When the MOSFET 31 is turned on, for example, current flows from the battery 3 into the choke coil 32 during the ON period of the MOSFET 31, and energy is accumulated in the choke coil 32. At this moment, the diode D31 is reverse-biased by the ON state of the MOSFET 31.

When the MOSFET 31 is turned off, a counter electromotive force is generated in the choke coil 32, current flows in the output side via the diode D31, charging the capacitor C31 and feeding power to the output side, that is, the cathode side (Terminal e) of the diode D31.

The voltage on the output side (Terminal e) is caused to change by changing the voltage obtained by dividing the output side (Terminal e) by the resistor R31, and the resistor R32 and the variable resistor VR31, that is by changing the pulse width of the PWM control signal output by Pin Nos. 9 and 10 of the controlling switching IC 33 by changing the variable resistor VR31, thereby changing the ON/OFF time ratio (on-duty) of the MOSFET 31.

That is, a DC voltage of 30 V, for example, can be obtained on Terminal e in the voltage booster circuit portion 30 based on the DC voltage of 12 V of the commercially available battery 3 without using transformer. Needless to say, the DC voltage of the battery 3 is not limited to 12 V, but may be set to the voltage of an automobile battery, if the vibrating compressor is used on an automobile. Similarly, the boosted voltage is also not limited to 30 V, but may be determined depending on the characteristics of the vibrating compressor.

Figure 7:
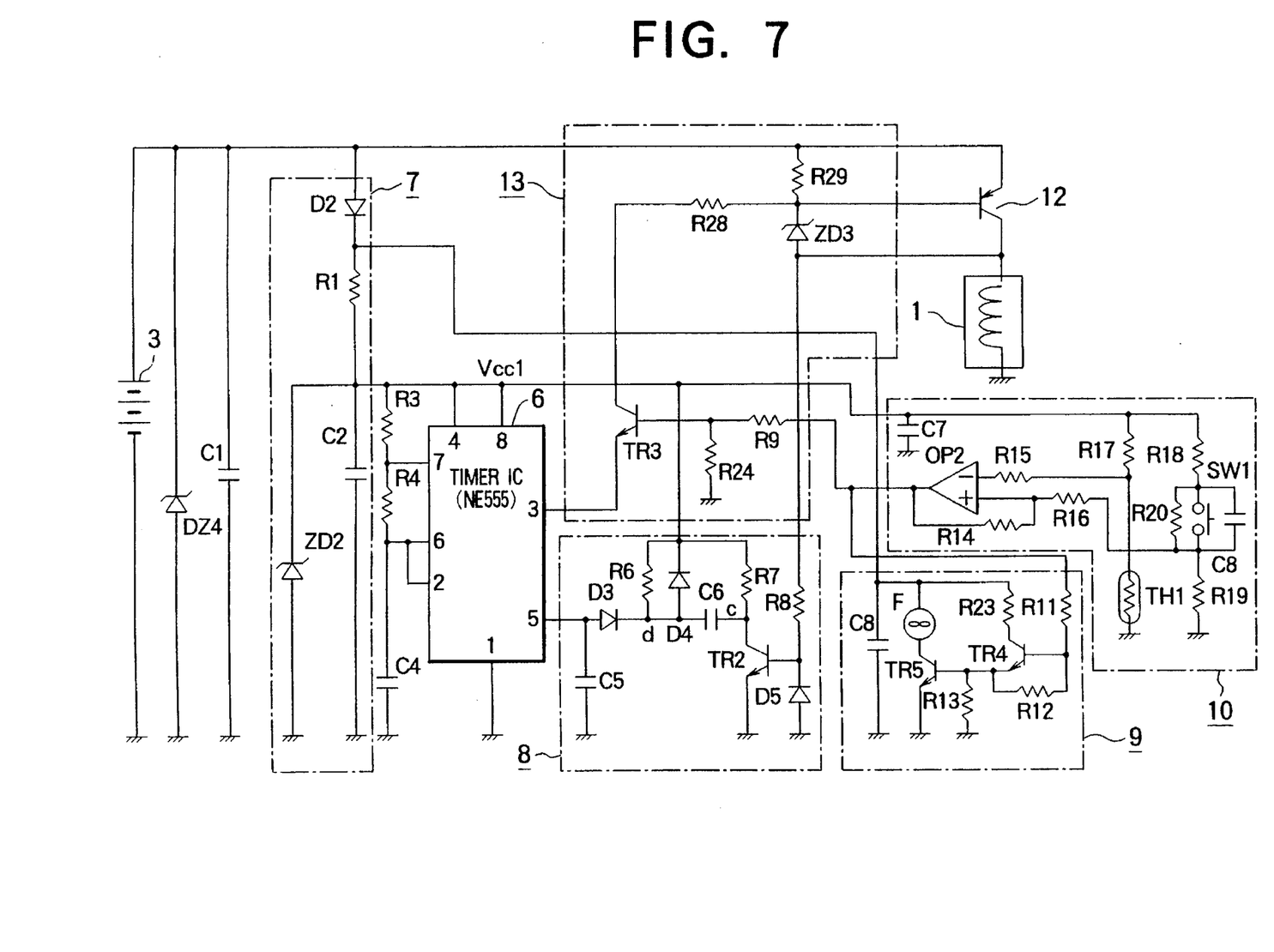
FIG. 7 shows still another construction of a power supply for vibrating compressor according to this invention.

FIG. 7 shows still another construction of a power supply for vibrating compressor according to this invention.

In FIG. 7, the emitter of the bipolar transistor 12 is connected directly to the positive-pole side of the battery 3. That is, the power supply shown in FIG. 7 has no voltage booster circuit portion 30 shown in FIG. 6, but is connected directly to the battery 3.

For this reason, a capacitor C1 and a constant-voltage diode DZ4 are connected to the power supply, together with the battery 3. The capacitor C1 and the constant-voltage diode DZ4 correspond to a capacitor C1' and a constant-voltage diode DZ4' in FIG. 6, respectively.

As the battery 3 is connected directly to the power supply, the output of the battery 3 is supplied to a resistor R1 and a fan drive circuit 9 via a diode D2 to obtain a voltage corresponding to the input of the stabilization circuit 7, that is, the output at Terminal g. The diode D2 corresponds to a diode D2' in FIG. 6.

The construction of the power supply of FIG. 7 in other respects is similar to that of the power supply shown in FIG. 4. Consequently, the operation of the power supply of FIG. 7 is similar to the operation (FIG. 5) of the power supply shown in FIG. 4. In this way, the power supply of FIG. 7 is an embodiment where the DC voltage of the battery 3 is converted into an AC voltage to power the vibrating compressor 1.

As described above, since the power supply of the vibrating compressor of this invention uses a switching element for converting DC current into AC current, that is, a MOSFET or bipolar transistor, and a timer IC for pulse-generating to switch the MOSFET or bipolar transistor, circuit configuration can be simplified, the number of parts can be reduced, and the manhour for assembly can be reduced. All this leads to reduced manufacturing cost.

Furthermore, the arrangement of the voltage booster circuit portion where the DC voltage of a commercially available battery can be boosted to a desired voltage by using a variable resistor without using transformer to supply to the switching element makes it possible to easily obtain desirable source voltages to match variations in coil windings of vibrating compressors, and at the same time, to reduce the weight and manufacturing cost of the vibrating compressor.

What is claimed is:

1. A power supply for vibrating compressors having an AC voltage generating circuit portion for generating AC voltage to power a vibrating compressor; said AC voltage generating circuit portion comprising a switching element for driving said vibrating compressor, pulse generating means for generating pulses to cause said switching element to switch, a forced operation circuit for detecting a timing at which a counter electromotive force generated by said vibrating compressor during OFF period of said switching element is recovered to the neighborhood of 0 volts and forcibly reversing an output of said pulse generating means at said detected timing, and drive means for driving said switching element based on the output of said pulse generating means, so that the optimum AC voltage of the most efficient frequency is supplied to said vibrating compressor.

2. A power supply for vibrating compressors as set forth in claim 1 wherein said switching element comprises a MOSFET, and said drive means comprises a driver for driving said MOSFET and a gate voltage circuit.

3. A power supply for vibrating compressors as set forth in claim 2 wherein the source of said MOSFET is connected to said vibrating compressor, and said driver supplies a voltage stabilized by said gate voltage circuit to a gate of said MOSFET.

4. A power supply for vibrating compressors as set forth in claim 3 wherein said driver include a photocoupler; said photocoupler feeding a voltage stabilized by said gate voltage circuit to the gate of said MOSFET, and electrically separating the control signal side from the stabilized voltage side of said photocoupler.

5. A power supply for vibrating compressors as set forth in claim 1 wherein said switching element comprises a bipolar transistor, and said drive means comprises a base-current supply circuit for controlling said bipolar transistor.

6. A power supply for vibrating compressors as set forth in claim 5 wherein the emitter of said bipolar transistor is connected directly to a battery.

7. A power supply for vibrating compressors as set forth in claim 1 also has a voltage booster circuit portion for boosting the DC voltage of a battery; a voltage boosted by said voltage booster circuit portion is supplied to said AC voltage generating circuit portion.

8. A power supply for vibrating compressors as set forth in claim 7 wherein said voltage booster circuit portion comprises a transformerless circuit.

9. A power supply circuit for vibrating compressors as set forth in claim 1 also has a thermo-control circuit for controlling temperature in a refrigerator composed of said vibrating compressor; said thermo-control circuit controlling said switching element via said drive means in such a manner that when temperature in said refrigerator falls below a predetermined temperature, voltage is prevented from being supplied to said vibrating compressor.

* * * * *